(12) United States Patent
Bernard

(10) Patent No.: US 6,559,378 B1
(45) Date of Patent: May 6, 2003

(54) REDUCER FITTING FOR ROUTING SYSTEM

(75) Inventor: William A. Bernard, Darien, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/280,904

(22) Filed: Oct. 25, 2002

Related U.S. Application Data

(60) Provisional application No. 60/335,011, filed on Oct. 31, 2001.

(51) Int. Cl.$^7$ .................................................. H02G 3/04
(52) U.S. Cl. ........................ 174/48; 174/71 R; 385/100; 385/135
(58) Field of Search ................... 174/49, 72 A, 174/72 C, 72 R, 101, 48, 71 R; 138/157; 248/68.1; 385/100, 134, 135

(56) References Cited

U.S. PATENT DOCUMENTS

| | | | |
|---|---|---|---|
| 4,163,572 A | * | 8/1979 | Benscoter ..................... 174/48 |
| 4,164,618 A | * | 8/1979 | Casasanta ..................... 174/48 |
| 5,067,678 A | | 11/1991 | Henneberger et al. |
| 5,161,580 A | | 11/1992 | Klug |
| 5,300,731 A | * | 4/1994 | DeBaratolo et al. .......... 174/48 |
| 5,394,502 A | * | 2/1995 | Caron ........................ 385/134 |
| 5,469,893 A | * | 11/1995 | Caveney et al. ............ 138/162 |
| 5,747,733 A | * | 5/1998 | Woods et al. .................. 174/48 |
| 5,753,855 A | | 5/1998 | Nicoli et al. |
| 6,002,089 A | | 12/1999 | Hemingway et al. |
| 6,037,543 A | | 3/2000 | Nicoli et al. |
| 6,262,365 B1 | * | 7/2001 | Ewer ........................... 174/48 |
| 6,284,975 B1 | * | 9/2001 | McCord et al. ........... 174/71 R |
| 6,288,331 B1 | * | 9/2001 | Wirthwein et al. ........... 174/48 |
| 6,448,495 B1 | * | 9/2002 | Mattei et al. ................. 174/48 |
| 6,459,038 B1 | * | 10/2002 | Waszak et al. ................ 174/48 |
| 6,472,596 B1 | * | 10/2002 | DeBartolo et al. ............ 174/48 |

* cited by examiner

Primary Examiner—Dean A. Reichard
Assistant Examiner—Adolfo Nino
(74) Attorney, Agent, or Firm—Robert A. McCann; Jay A. Saltzman; Christopher S. Clancy

(57) ABSTRACT

A fitting for routing cables between first and second ducts in a raceway system, the first duct having a first cross-sectional dimension and the second duct having a second and different cross-sectional dimension from the first cross-sectional dimension, the fitting including a first end for attaching to the first duct, a second end for attaching to the second duct, and an insertable reducer disposable generally between the first and second ends of the fitting, the reducer for adapting the fitting to transition between the first and second cross-sectional dimensions, the reducer including a barb for bitingly engaging at least one of the ducts and retaining the at least one duct to said fitting.

26 Claims, 6 Drawing Sheets

REDUCER FITTING FOR ROUTING SYSTEM

RELATED APPLICATION

Applicant claims, under 35 U.S.C. §119(e), the benefit of priority of the filing date of Oct. 31, 2001, of U.S. Provisional Patent Application Serial No. 60/335,011, filed on the aforementioned date, the entire contents of which are incorporated herein by reference.

FIELD OF THE INVENTION

The present invention relates to the field of duct-type cable routing systems. More specifically, the invention relates to a reducer used to attach duct of a relatively smaller size to duct of a relatively larger size.

BACKGROUND OF THE INVENTION

Channel-type duct systems are currently used to contain wiring and fiber-optic cables in commercial and industrial buildings. Duct fittings having a variety of configurations for joining separate sections of fiber duct are well known in the industry. One such duct fitting is a vertical tee fitting. The vertical tee is T-shaped fitting that joins three separate pieces of duct together, two horizontal ducts and one vertical duct. Fittings, such as the vertical tee, are designed to connect with ducts of specific dimensions. However, sometimes there is a need to use a fitting to connect ducts of different dimensions than were intended for the specific fitting. When the duct requiring connection is smaller than what was intended for the specific fitting, it is common practice in the industry to use a reducer to narrow the fitting cross-section at the junction with the smaller duct. For example, a vertical tee fitting originally designed to connect to a 4-inch×4-inch vertical duct may sometimes be needed to attach to a 2-inch×2-inch vertical duct instead. A reducer attached to this vertical tee fitting would allow this fitting to connect with the 2-inch×2-inch duct.

Currently, the reducers for vertical tee fittings attach to the bottom of the vertical tee. These reducers can use over 5 inches of space below the vertical tee fitting. Meanwhile, due to the relative proximity of network racks and the like to ceilings and/or horizontal duct running overhead, vertical space may be at a premium or even completely unavailable. Thus, there is a need in the industry for a reducer that encompasses minimal space below the bottom of the vertical tee fitting.

Accordingly, it is desirable to provide a reducer that occupies minimal or, preferably, no additional space below the bottom of the vertical tee fitting, or more generally, minimal or no additional space beyond the extent of a fitting. The present invention provides such a reducer, which may preferably be latchably seated completely or almost completely within the fitting and thereby uses little or no additional space.

It is further desirable to provide a reducer that does not interfere with any other features or uses of the fitting. The present invention does not interfere with any other uses of the vertical tee fitting and even allows for the original covers to be used with both the vertical tee fitting and the duct that attaches to the fitting.

SUMMARY OF THE INVENTION

To address the above-stated objectives and/or deficiencies of prior designs, there is provided a fitting for routing cables between first and second ducts in a raceway system, the first duct having a first cross-sectional dimension and the second duct having a second and different cross-sectional dimension from the first cross-sectional dimension, the fitting including a first end for attaching to the first duct, a second end for attaching to the second duct, and an insertable reducer disposable generally between the first and second ends of the fitting, the reducer for adapting the fitting to transition between the first and second cross-sectional dimensions, the reducer including a barb for bitingly engaging at least one of the ducts and retaining the at least one duct to the fitting.

There is also provided a raceway system for routing cables, the raceway system including a generally horizontal duct of a first cross-sectional dimension, a generally vertical duct of a second cross-sectional dimension smaller than the first cross-sectional dimension, a fitting for connecting the horizontal and vertical ducts, and a reducer insertably disposable within the fitting for transitioning the fitting between the first and second cross-sectional dimensions, the reducer including a barb for bitingly engaging at least one of the ducts and retaining the at least one duct to the fitting.

There is also provided an insertable reducer for a vertical tee fitting for connecting a pair of generally horizontal ducts and a vertical duct for routing cables within a raceway system, the reducer for narrowing the cross-sectional cable routing space within the vertical tee fitting to transition the fitting from the relatively larger cross-sectional cable routing space of the horizontal ducts to the relatively smaller cross-sectional cable routing space of the vertical duct, the reducer including a barb for bitingly engaging at least one of the ducts and retaining the at least one duct to the fitting.

Also provided is a fitting for routing cables between first and second ducts in a raceway system, the first duct having a first cross-sectional dimension and the second duct having a second and different cross-sectional dimension from the first cross-sectional dimension, the fitting including a first end for attaching to the first duct, a second end for attaching to the second duct, and an insertable reducer disposable generally between the first and second ends of the fitting, the reducer for adapting the fitting to transition between the first and second cross-sectional dimensions, the reducer being disposable in the fitting such that the reducer does not extend significantly beyond the fitting in the direction of either of the ducts.

There is also provided a method of using a fitting to connect a pair of horizontal ducts having a relatively larger cross-sectional dimension to a vertical duct having a relatively smaller cross-sectional dimension within a raceway system for routing cables, the method including the following steps: providing a fitting; providing a reducer insertable into the fitting, the reducer including a barb; providing first and second connectors; connecting a first end of the fitting to one of the pair of horizontal ducts with the first connector; connecting a second end of the fitting to the other of the pair of horizontal ducts with the second connector; inserting a reducer having a latch into the fitting such that the latch engages the fitting to retain the reducer in a fixed position within the fitting; and connecting a portion of the fitting proximate the inserted reducer to the vertical duct by sliding the vertical duct between portions of the reducer and the fitting such that the barb bitingly engages the vertical duct for retaining the vertical duct relative to the fitting.

DETAILED DESCRIPTION OF THE PREFERRED EMBODIMENTS

Figure 1:
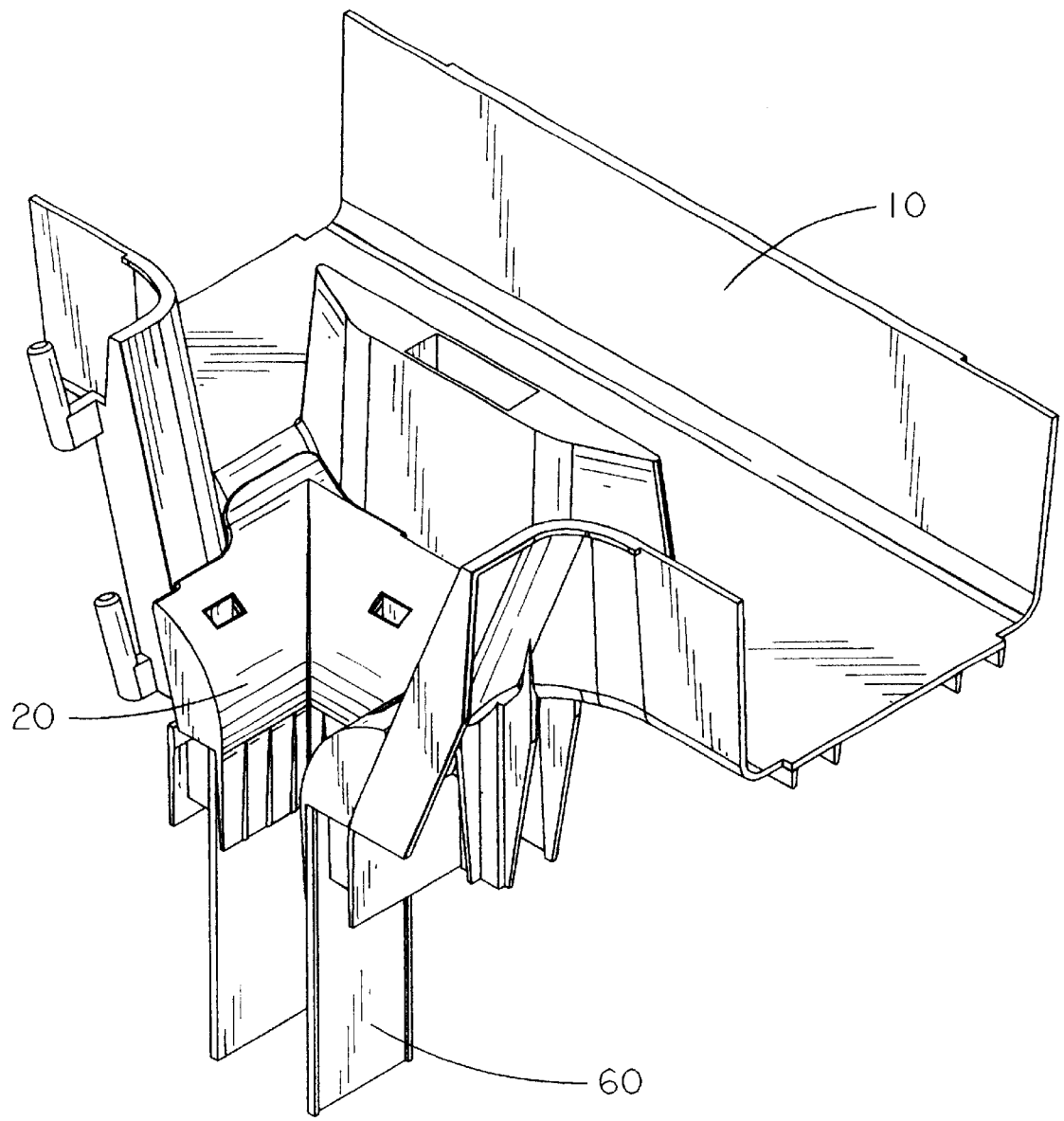
FIG. 1 is a perspective view of a vertical tee fitting for connecting relatively larger horizontal ducts with a relatively smaller vertical duct, in accordance with an embodiment of the present invention.
Figure 2:
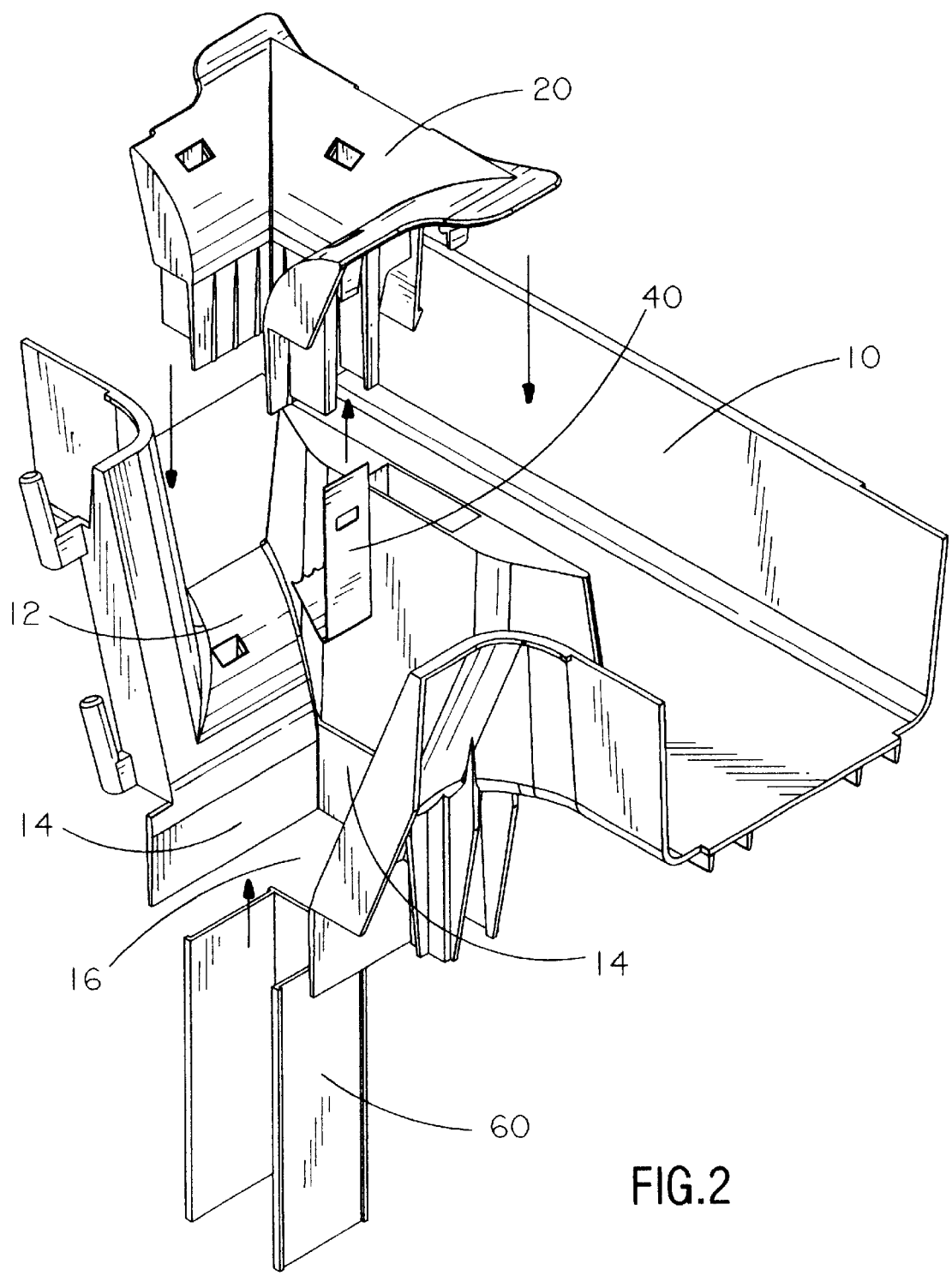
FIG. 2 is an exploded view of the vertical tee fitting of FIG. 1.

Turning now to the drawings, FIGS. 1–2 show a vertical tee reducer 20 of the present invention positioned within a vertical tee fitting 10. The vertical tee fitting 10 contains a vertical drop-out area 16 that connects with a first vertical duct system and creates continuous, uninterrupted channel-shaped duct between the horizontal and vertical duct systems. The vertical drop-out area 16 is defined by the floor 12 of the vertical tee fitting 10 and by the vertical walls 14 of the fitting 10. The reducer 20 of the present invention is designed to fit snugly within this vertical dropout area 16 but not extend beyond the bottom of the vertical tee fitting 10. A similar reducer could be used in various types of duct fittings other than vertical tee fittings.

Figure 3:
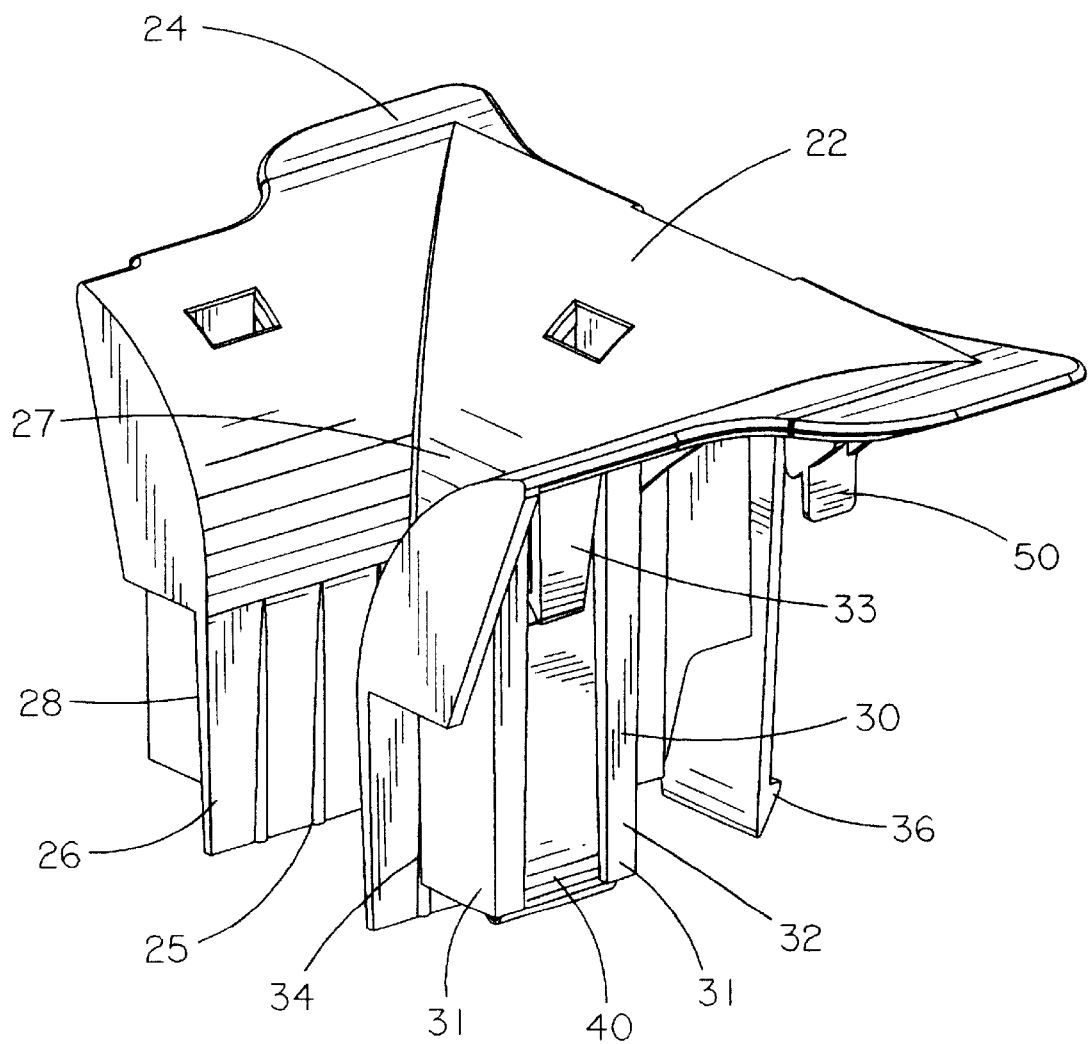
FIG. 3 is an enlarged perspective view of the reducer shown in FIG. 2.

With respect to the vertical tee fitting, in a preferred embodiment, as shown in FIG. 3, the reducer 20 has three sidewalls. These three sidewalls 22 are integrally connected to form a channel-shaped duct. These sidewalls 22 gradually flare outwards at the top and integrally extend into two flanges 24. The flare of the sidewalls is designed to allow the flanges 24 to fit flush against the floor 12 of the vertical tee fitting 10. Preferably, there is a 2" bend radius control for the flare of the sidewalls 22. However, one of skill in the art, following the EIA/TIA standards for appropriate minimum bend radii of wires and cables, would be able to design the radius of the flare of the sidewall 22 to conform to their specific vertical tee fitting 10.

The flanges 24 help position the reducer 20 within the vertical drop-out area 16 of the vertical tee fitting 10. The flanges 24 also ensure a continuity between the floor 12 of the vertical tee fitting 10 and the new smaller vertical drop-out area 27 created by the reducer 20, while protecting against microbends occurring in the fiber.

A series of vertical ribs 25 may be formed along the bottom half of the sidewalls 22 and these ribs may provide additional stiffness, may serve as surface contact points, or may facilitate the molding of the sidewalls 22. The sidewalls 22 have an inner surface 26 and an outer surface 28. The inner surfaces 26 of the sidewalls 22 face each other and form the perimeter of the new smaller vertical dropout area 27. The outer surfaces 28 of the sidewalls 22 face the vertical walls 14 and floor 12 forming the original drop-out area 16 of the vertical tee fitting 10.

Figure 4:
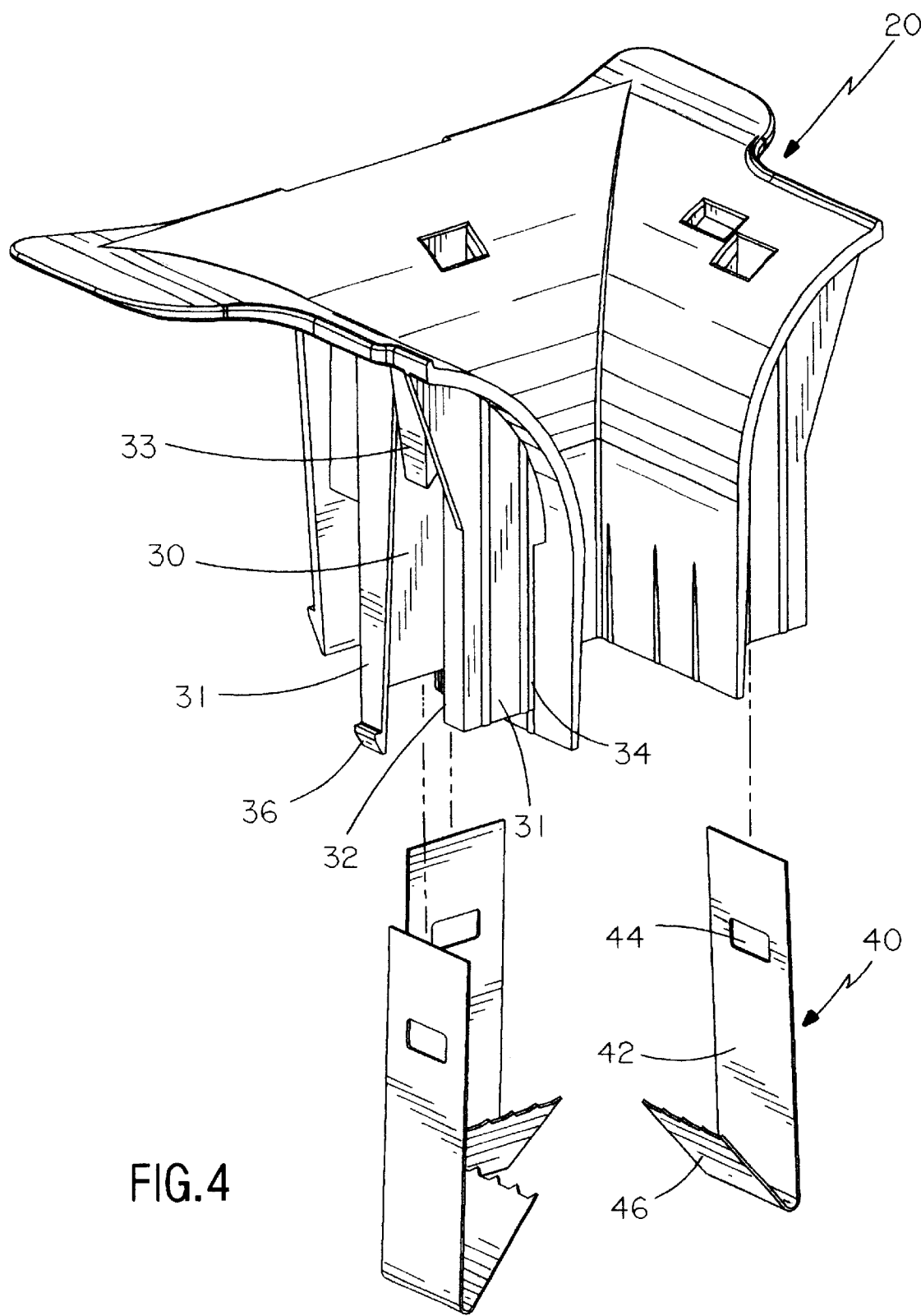
FIG. 4 is an exploded view of an alternative embodiment of a reducer in accordance with the invention.
Figure 5:
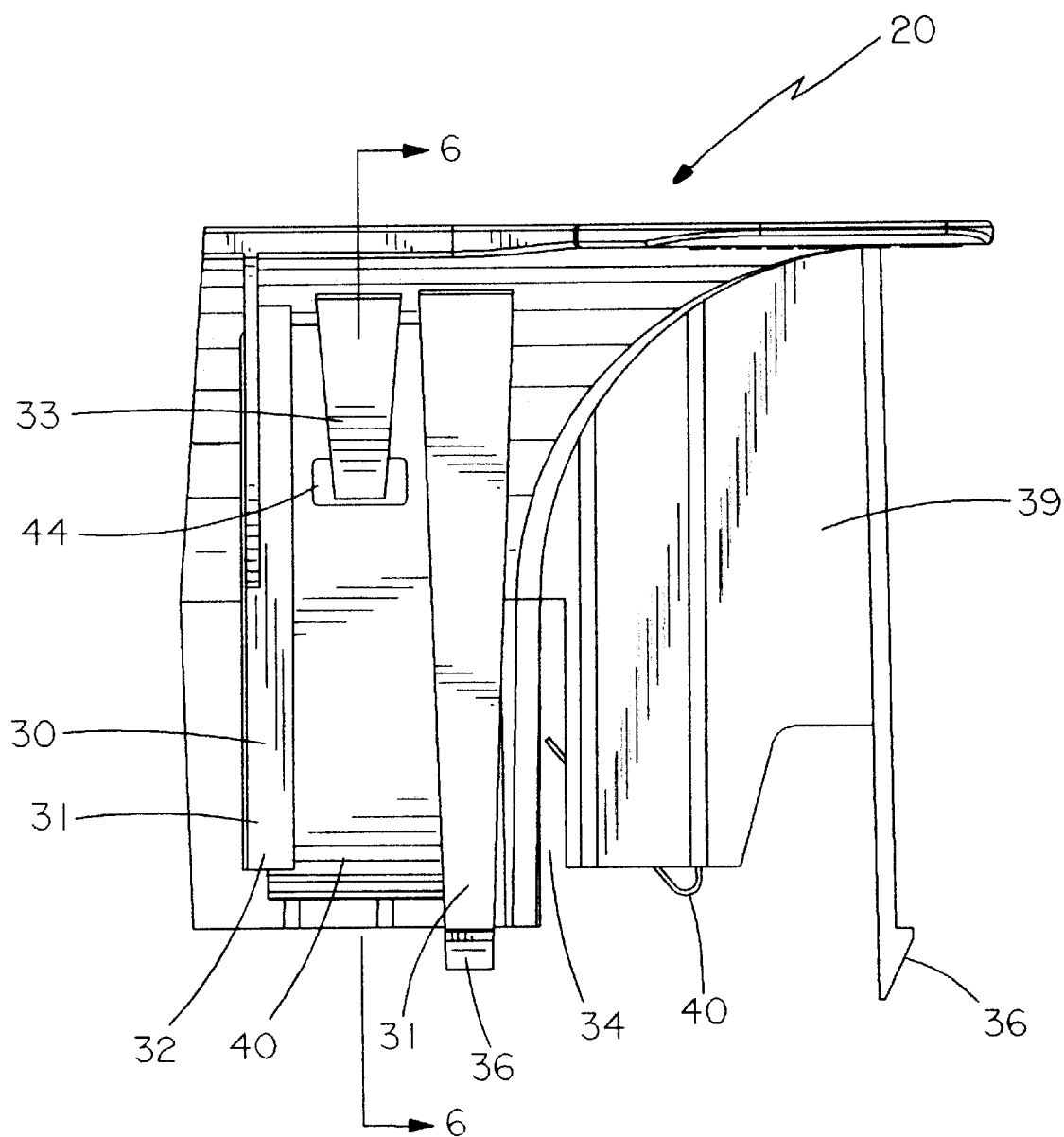
FIG. 5 is a side view of the reducer of FIG. 4.
Figure 6:
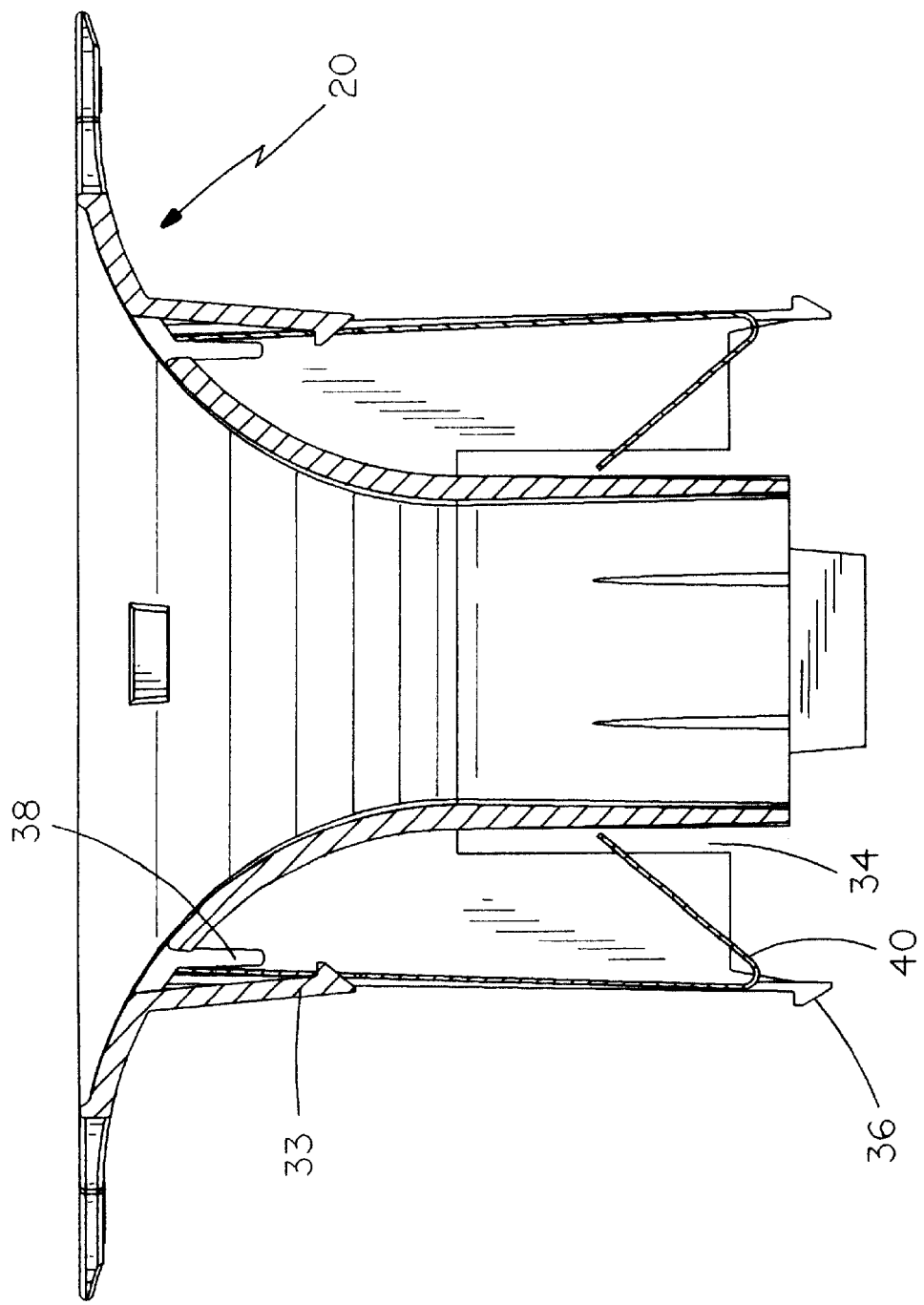
FIG. 6 is a cross-sectional view of the reducer of FIG. 4.

The smaller vertical drop-out area 27 of the reducer 20 will form a continuous channel-shaped duct with the second smaller vertical duct 60. This second smaller vertical duct 60 is attached to the reducer and held into place via three barbs 40. As shown in FIG. 4, the barb 40 is comprised of a rectangular body 42, bent inwardly to form an arm 46 at one end of the body 42 and having an eyelet 44 at the opposite end. The barb 40 bitingly engages the second vertical duct 60 and holds it into position against the outer surface 28 of the sidewalls 22 of the reducer 20. Preferably, the arm 46 has a serrated edge, which will increase the biting engagement capability of the barb 40.

The barbs 40 are held into position against the second smaller vertical duct 60 by the barb housings 30, which are placed along the outer surface 28 of each sidewall 22 of reducer 20. As shown in FIGS. 3–6, the barb housing 30 comprises at least two opposing L-shaped walls 31. These L-shaped walls 31 are perpendicular to the outer surface 28 of the sidewall 22, such that the two L-shaped walls 31 and the sidewall 22 together form a three-sided box. The two opposing L-shaped walls 31 mirror each other with the short leg of the L-shape facing one another. This allows the two L-shaped walls to form an open fourth side 32 to the box formed by the L-shaped walls and the sidewall. The two opposing L-shaped walls 31 are spaced just far enough apart to allow a barb 40 to be positioned between them.

The barb 40 is positioned within the housing 30 and the edge of the arm 46 of the barb 40 may preferably touch the outer surface 28 of the sidewalls 22 of the reducer 20. The body 42 of the barb 40 is held tight against the open side 32 of the housing 30 by two barb guides 38. Furthermore, a barb catch 33 is inserted into the eyelet 44 of the barb 40 in order to prevent the barb 40 from being pulled out of the barb housing 30 by a downward force.

A receiving space 34 is formed between the L-shaped walls 32 of the housing 30 and the outer surface 28 of the sidewalls 22 of the reducer 20. When the second smaller vertical duct 60 is attached to the reducer 20, one end of the second smaller vertical duct 60 is slid into the receiving space 34 so that it is positioned substantially against the outer surface 28 of the sidewall 22 within the barb housing 30. The edge of the arm 46 of the barb 40 then engages the surface of the second smaller vertical duct 60 and holds it firmly in position so that the duct 60 does not withdraw due to inadvertently or incidentally applied forces.

The barb housing further comprises a catch 36 that overlaps the bottom edge of the vertical tee fitting 10 and prevents reducer 20 the from being pushed out of position by an upward force, such as when the second smaller vertical duct 60 is attached to the reducer. The catch 36 may be part of the open side 32 of the barb housing 30. The catch 36 may also be a separate piece attached to the outer surface 28 of the sidewall 22. Optionally, other separate pieces, such as tabs 50, may be attached to the outer surface 28 of the sidewalls 22. The tabs 50 fit into slots in floor 12 of the vertical tee fitting 10 to assist in positioning the reducer 20 correctly within the vertical drop-out area 16 of the fitting 10.

The barb housing 30 provides spacing between the smaller vertical dropout area 27 of the reducer 20 and the vertical drop-out area 16 of the fitting 10. The open side 32 of the barb housing 30 fits flush against the vertical walls 14 of the vertical tee fitting 10 to ensure that the reducer 20 is properly aligned within that vertical drop-out area 16 of the vertical tee fitting 10 and to deter the occurrence of microbends or other signal-degrading phenomena in the fiber. If the barb housing 30 does not occupy the entire space between the vertical drop-out area 27 of the reducer 20 and the vertical walls 14 of the vertical tee fitting 10, a wall extension 39 may be attached to the open side 32 of the barb housing 30 in order to occupy this extra space and make the reducer 20 fit flush against the vertical wall 14 of the fitting 10.

Second, the catches 36 on the barb housing lock the reducer 20 into place so that it does not move out of the vertical drop-out area 16 when trying to attach the second smaller vertical duct to the reducer 20. Although a single one may be sufficient, there is preferably a catch 36 located on each barb housing 30.

Third, the barb housing 30 holds the barb 40 in a position to maintain a strong engagement with the second smaller vertical duct 60. The barb housing 30 positions the barb so that the edge of the arm 46 of the barb 40 is angled upwards and into the second smaller vertical duct 60, when the second smaller vertical duct 60 is located within the receiving space 34 of the housing 30. Due to the angle of the arm 46 of the barb 40, a downward or withdrawal force on the second smaller vertical duct 60 would cause the edge of the arm 46 to bite harder into the surface of the second smaller vertical duct 60 and prevent the duct from moving out of the receiving space 34. This prevents inadvertent withdrawal or slippage of the duct 60 and produces a minimum withdrawal force that must be applied to overcome the resistance capability of the barb(s) to uncouple the duct 60 from the vertical tee/reducer assembly.

Because the reducer 20 of the present invention fits substantially entirely within the vertical drop-out area 16 of the vertical tee fitting 10, it occupies no significant additional space below the fitting 10. Additionally, a cover for the vertical tee fitting 10 may be used in the same manner with or without the reducer 20 in place because the reducer does not extend substantially past the front of the vertical tee 10. The reducer 20 of the present invention also does not interfere with a cover for the second smaller vertical duct 60 that is attached to the reducer 20.

It should be understood that a wide range of changes and modifications can be made to the embodiments of the reducer described above. For instance, a fitting other than a vertical tee may be adapted with a reducer of the type described and claimed herein. Additionally or alternatively, the slope and/or curvature of the sidewalls, the dimensions of the barb housings, the cross-sectional dimensions of the respective ducts connected to the fitting, the number of catches, the extensions added to the housing, or the addition of tabs may be different than the exemplary embodiments described above, depending upon the specific fitting used and the consumer and manufacturing preferences.

Additionally, it's easily seen that a method of wiring a fitting having a barbed reducer to connect ducts of different sizes could have steps performed equivalently in a number of different orders. For example, with respect to the vertical tee fittings described above, the reducer could be inserted into the fitting either before or after the horizontal ducts were connected to the fitting. It is therefore intended that the foregoing description illustrates rather than limits this invention, and that it is the following claims, including all equivalents, which define this invention.

What is claimed is:

1. A fitting for routing cables between first and second ducts in a raceway system, said first duct having a first cross-sectional dimension and said second duct having a second and different cross-sectional dimension from said first cross-sectional dimension, said fitting comprising:
    a first end for attaching to said first duct;
    a second end for attaching to said second duct; and
    an insertable reducer disposable generally between said first and second ends of said fitting, said reducer for adapting said fitting to transition between said first and second cross-sectional dimensions, said reducer including a barb for bitingly engaging at least one of said ducts and retaining said at least one duct to said fitting.

2. A fitting in accordance with claim 1 wherein when said insertable reducer is disposed in said fitting, said reducer does not extend significantly beyond said fitting in the direction of either of said ducts.

3. A fitting in accordance with claim 1 wherein said reducer includes bend radius control properties.

4. A fitting in accordance with claim 1 wherein said reducer includes at least one flared portion for protecting said cables against microbends.

5. A fitting in accordance with claim 1 wherein said reducer includes three barbs for bitingly engaging one of said ducts and retaining said one duct to said fitting.

6. A fitting in accordance with claim 1 wherein said barb includes a serrated end for facilitating said biting engagement.

7. A fitting in accordance with claim 1 wherein said reducer includes a latch for retaining said reducer in its insertable position within said fitting.

8. A fitting in accordance with claim 1 wherein said first duct is at least approximately four inches by four inches in cross-sectional dimension and said second duct is no more than approximately two inches by two inches in cross-sectional dimension.

9. A raceway system for routing cables, said raceway system comprising:
    a generally horizontal duct of a first cross-sectional dimension;
    a generally vertical duct of a second cross-sectional dimension smaller than said first cross-sectional dimension;
    a fitting for connecting said horizontal and vertical ducts; and
    a reducer insertably disposable within said fitting for transitioning said fitting between said first and second cross-sectional dimensions, said reducer including a barb for bitingly engaging at least one of said ducts and retaining said at least one duct to said fitting.

10. A raceway system in accordance with claim 9 wherein when said reducer is disposed in said fitting, said reducer does not extend significantly beyond said fitting in the direction of either of said ducts.

11. A raceway system in accordance with claim 9 wherein said reducer includes bend radius control properties.

12. A raceway system in accordance with claim 9 wherein said reducer includes at least one flared portion for protecting said cables against microbends.

13. A raceway system in accordance with claim 9 wherein said reducer includes three barbs for bitingly engaging one of said ducts and retaining said one duct to said fitting.

14. A raceway system in accordance with claim 9 wherein said barb includes a serrated end for facilitating said biting engagement.

15. A raceway system in accordance with claim 9 wherein said reducer includes a latch for retaining said reducer in its insertable position within said fitting.

16. A raceway system in accordance with claim 9 wherein said horizontal duct is at least approximately four inches by four inches in cross-sectional dimension and said vertical duct is no more than approximately two inches by two inches in cross-sectional dimension.

17. An insertable reducer for a vertical tee fitting for connecting a pair of generally horizontal ducts and a vertical duct for routing cables within a raceway system, said reducer for narrowing the cross-sectional cable routing space within the vertical tee fitting to transition said fitting from said relatively larger cross-sectional cable routing space of said horizontal ducts to said relatively smaller cross-sectional cable routing space of said vertical duct, said reducer including a barb for bitingly engaging at least one of said ducts and retaining said at least one duct to said fitting.

18. An insertable reducer in accordance with claim 17 wherein when said insertable reducer is disposed in said fitting, said reducer does not extend significantly beyond said fitting in the direction of either of said ducts.

19. A reducer in accordance with claim 17 further including bend radius control properties.

20. A reducer in accordance with claim 17 further including at least one flared portion for protecting against said cables against microbends.

21. A reducer in accordance with claim 17 wherein said reducer includes three barbs for bitingly engaging one of said ducts and retaining said one duct to said fitting.

22. A reducer in accordance with claim 17 wherein said barb includes a serrated end for facilitating said biting engagement.

23. A reducer in accordance with claim 17 wherein said reducer further includes a latch for retaining said reducer in its insertable position within said fitting.

24. A reducer in accordance with claim 17 wherein said horizontal ducts are at least approximately four inches by four inches in cross-sectional dimension and said vertical duct is no more than approximately two inches by two inches in cross-sectional dimension.

25. A fitting for routing cables between first and second ducts in a raceway system, said first duct having a first cross-sectional dimension and said second duct having a second and different cross-sectional dimension from said first cross-sectional dimension, said fitting comprising:

a first end for attaching to said first duct;

a second end for attaching to said second duct; and an insertable reducer disposable generally between said first and second ends of said fitting, said reducer for adapting said fitting to transition between said first and second cross-sectional dimensions, said reducer being disposable in said fitting such that said reducer does not extend significantly beyond said fitting in the direction of either of said ducts.

26. A method of using a fitting to connect a pair of horizontal ducts having a relatively larger cross-sectional dimension to a vertical duct having a relatively smaller cross-sectional dimension within a raceway system for routing cables, said method comprising the following steps:

providing a fitting;

providing a reducer insertable into said fitting, said reducer including a barb;

providing first and second connectors;

connecting a first end of said fitting to one of said pair of horizontal ducts with said first connector;

connecting a second end of said fitting to the other of said pair of horizontal ducts with said second connector;

inserting a reducer having a latch into said fitting such that said latch engages said fitting to retain said reducer in a fixed position within said fitting; and connecting a portion of said fitting proximate said inserted reducer to said vertical duct by sliding said vertical duct between portions of said reducer and said fitting such that said barb bitingly engages said vertical duct for retaining said vertical duct relative to said fitting.

* * * * *